United States Patent
Abd Elhamid et al.

(10) Patent No.: US 8,007,958 B2
(45) Date of Patent: Aug. 30, 2011

(54) PEM FUEL CELL WITH IMPROVED WATER MANAGEMENT

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 991 days.

(21) Appl. No.: 11/842,525

(22) Filed: Aug. 21, 2007

(65) Prior Publication Data

US 2009/0053572 A1    Feb. 26, 2009

(51) Int. Cl.
*H01M 4/88*    (2006.01)
*H01M 4/94*    (2006.01)

(52) U.S. Cl. .................. 429/534; 429/535; 502/101

(58) Field of Classification Search .............. 429/534, 429/535; 427/115; 502/101
See application file for complete search history.

(56) References Cited

U.S. PATENT DOCUMENTS

| | | | | |
|---|---|---|---|---|
| 6,132,825 | A * | 10/2000 | Frisk | 428/35.7 |
| 6,942,941 | B2 * | 9/2005 | Blunk et al. | 429/437 |
| 2006/0240312 | A1 * | 10/2006 | Xie et al. | 429/42 |
| 2006/0286437 | A1 * | 12/2006 | Aihara et al. | 429/44 |
| 2007/0037040 | A1 * | 2/2007 | Koyama et al. | 429/44 |

FOREIGN PATENT DOCUMENTS

| | | |
|---|---|---|
| CN | 200510076395 | 6/2005 |
| CN | 200610101613 | 6/2006 |
| WO | 2006055124 | 5/2006 |

* cited by examiner

*Primary Examiner* — Stephen J. Kalafut
(74) *Attorney, Agent, or Firm* — Reising Ethington P.C.

(57) ABSTRACT

A product including a polymer electrolyte membrane, an electrode over the membrane, a gas diffusion media layer over the electrode, and a hydrophilic layer over the gas diffusion media layer.

23 Claims, 2 Drawing Sheets

PEM FUEL CELL WITH IMPROVED WATER MANAGEMENT

TECHNICAL FIELD

The field to which the disclosure generally relates includes fuel cells, fuel cell components, and methods of making and using the same.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen-rich gas or pure hydrogen and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

Proton exchange membrane (PEM) fuel cells are popular for vehicle applications. The PEM fuel cell generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane defines a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack includes a series of flow field or bipolar plates positioned between the several MEAs in the stack. The bipolar plates include an anode side and a cathode side for adjacent fuel cells in the stack. The fuel cell stack receives an anode hydrogen reactant gas that flows into the anode side of the stack. Anode gas flow channels are provided on the anode side of the bipolar plates that allow the anode gas to flow to the anode side of the MEA. The fuel cell stack receives a cathode reactant gas, typically a flow of air forced through the stack by a compressor. Cathode gas flow channels are provided on the cathode side of the bipolar plates that allow the cathode gas to flow to the cathode side of the MEA. Not all of the oxygen is consumed by the stack and some of the air is output as a cathode exhaust gas that may include liquid water as a stack by-product. The bipolar plates may also include flow channels for a cooling fluid. An automotive fuel cell stack, for example, may include about two hundred or more bipolar plates.

The bipolar plates are typically made of a conductive material, such as stainless steel, titanium, aluminum, polymeric carbon composites, or graphite etc., so that they conduct the electricity generated by the fuel cells from one cell to the next cell and out of the stack. Metal bipolar plates typically produce a natural oxide on their outer surface that makes them resistant to corrosion. However, this oxide layer is not conductive, and thus increases the internal resistance of the fuel cell, reducing its electrical performance. Also, the oxide layer may frequently make the plates more hydrophobic.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water accumulates within the flow channels because the flow rate of the reactant gas is too low to force the water out of the channels. As the water accumulates, it forms droplets that continue to expand because of the hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. Those areas of the membrane that do not receive reactant gases as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

SUMMARY OF EXEMPLARY EMBODIMENTS OF THE INVENTION

One embodiment of the invention provides a product including a polymer electrolyte membrane, an electrode over the membrane, a gas diffusion media layer over the electrode, and a hydrophilic layer over the gas diffusion media layer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
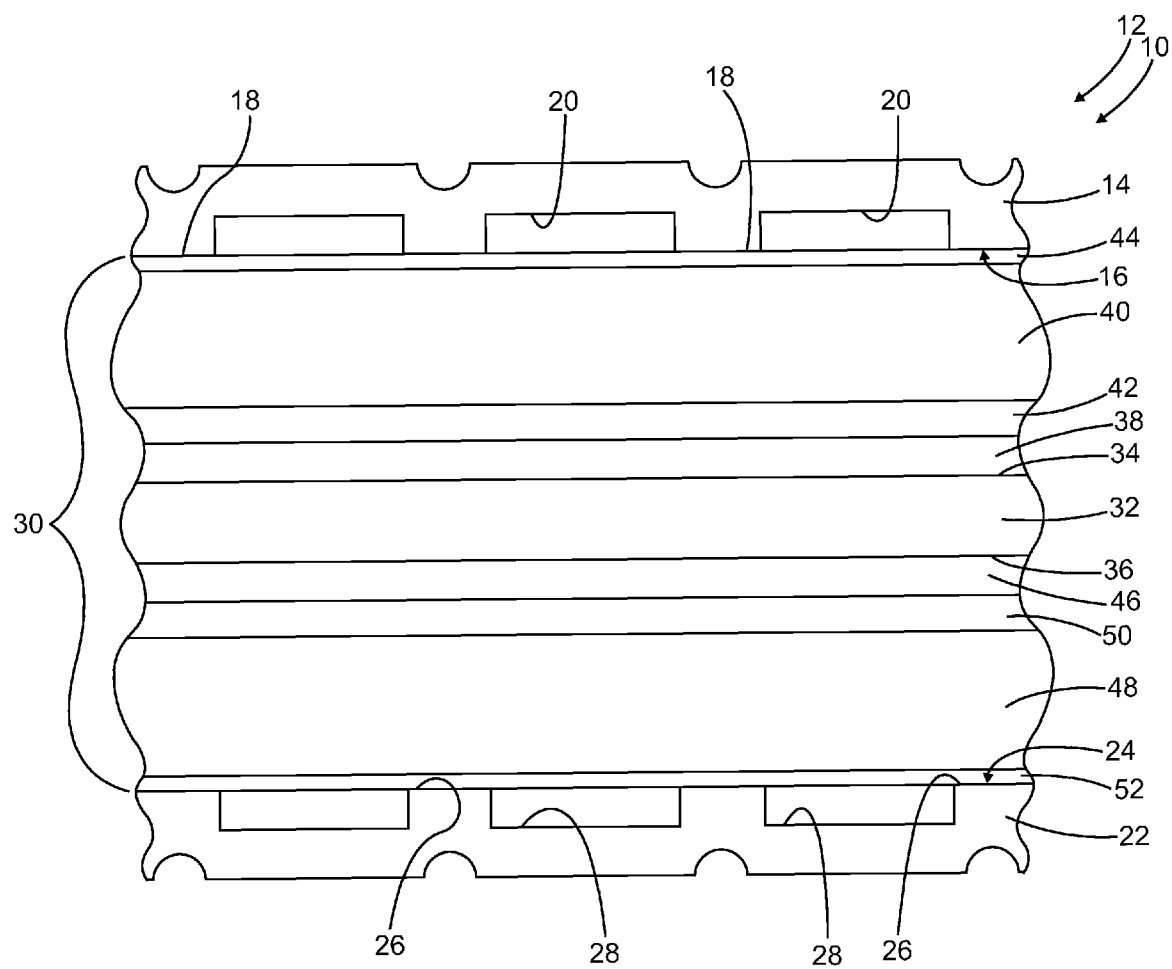
FIG. 1 illustrates a product according to one embodiment of the invention.

Referring to FIG. 1, one embodiment of the invention includes a product 10 comprising a fuel cell 12. The fuel cell 12 includes a first fuel cell bipolar plate 14 including a first face 16 having a reactant gas flow field defined therein by a plurality of lands 18 and channels 20. The reactant gas flow field may deliver a fuel on one side of the bipolar plate and an oxidant on the other side of the bipolar plate. The fuel cell 12 includes a second fuel cell bipolar plate 22 including a first face 24 having a reactant gas flow field defined therein by a plurality of lands 26 and channels 28. The lands 18 or 26 and channels 20 or 28 may be formed in the bipolar plate 14 or 22 by machining, etching, stamping, molding or the like. A soft goods portion 30 may be provided between the first fuel cell bipolar plate 14 and the second fuel cell bipolar plate 22. The first fuel cell bipolar plate 14 and the second fuel cell bipolar plate 22 may include a variety of materials including, but not limited to, a metal, metal alloy, and/or electrically conductive composite. In one embodiment, the first fuel cell bipolar plate 14 and the second fuel cell bipolar plate 22 may be stainless steel.

The soft goods portion 30 may include a polymer electrolyte membrane 32 comprising a first face 34 and a second face 36. A cathode electrode 38 may overlie the first face 34 of the polymer electrolyte membrane 32. A first gas diffusion media layer 40 may overlie the cathode electrode 38, and optionally a first microporous layer 42 may be interposed between the first gas diffusion media layer 40 and the cathode electrode 38. The first gas diffusion media layer 40 may be hydrophobic. The first fuel cell bipolar plate 14 may overlie the first gas diffusion media layer 40. In one embodiment, a first hydrophilic layer 44 may be interposed between the first fuel cell bipolar plate 14 and the first gas diffusion media layer 40. The first hydrophilic layer 44 may be detached from the first bipolar plate 14 and may underlie the lands 18 and channels 20 formed therein.

The first hydrophilic layer 44 may be a hydrophilic electrically conductive material that is stable in the fuel cell environment. The first hydrophilic layer 44 may be a carbon cloth or a carbon mat. The first hydrophilic layer 44 may not be treated with a hydrophobic material. In one embodiment, the first hydrophilic layer 44 may be a carbon cloth that is 8 mils thick. In another embodiment, the first hydrophilic layer 44 may be an un-teflonated carbon paper or gas diffusion medium that is chemically or physically treated for hydrophilicity. Chemical methods include the creation of polar function groups on the carbon paper surface using oxidizing agents such as chromic acid, potassium permanganate, or nitric acid. Alternatively, the paper can be treated using physical methods such as open air plasma assisted physical vapor deposition or ion beam assisted physical vapor deposition ("IBAPVD"). In one embodiment, the thickness of the first hydrophilic layer 44 may range from about 1 to about 8 mils. The hydrophilic layer 44 may have a porosity ranging from 30 to 90%. Other properties or characteristics of the hydrophilic layer 44 include sound thermal conductivity and good mechanical properties so as to withstand the compression pressures imposed on the paper during fuel cell stack operation In one embodiment, the water does not form droplets along the surfaces defining the channels 20 near the lands 18 and the water may tend to flow inside the channels 20 in a way that is similar to when the channels 20 have a hydrophilic coating.

An anode electrode 46 may underlie the second face 36 of the polymer electrolyte membrane 32. A second gas diffusion media layer 48 may underlie the anode layer 46, and optionally a second microporous layer 50 may be interposed between the second gas diffusion media layer 48 and the anode electrode 46. The second gas diffusion media layer 48 may be hydrophobic. The second fuel cell bipolar plate 22 may overlie the second gas diffusion media layer 48. In one embodiment, a second hydrophilic layer 52 may be interposed between the second fuel cell bipolar plate 22 and the second gas diffusion media layer 48. The second hydrophilic layer 52 may be detached from the second bipolar plate 22 and may overlie the lands 26 and channels 28 formed therein.

The second hydrophilic layer 52 may be a hydrophilic electrically conductive material that is stable in the fuel cell environment. The second hydrophilic layer 52 may be substantially identical to the first hydrophilic layer 44. In one embodiment, the water does not form droplets along the surfaces defining the channels 28 near the lands 26 and the water may tend to flow inside the channels 28 in a way similar to how it flows when the channels 28 have a hydrophilic coating.

The first hydrophilic layer 44 and the second hydrophilic layer 52 may contribute to better performance of the fuel cell through water management. The formation of water inside a fuel cell may lead to a significant loss in performance through what is known as low power stability (LPS). LPS is caused by the accumulation of water inside the flow field channels of the bipolar plates. This water prevents the reactive gases from reaching the catalyst layers on the membrane electrode assembly and therefore leads to significant mass transport limitations. The hydrophilic layers 44 and 52 may solve the LPS problem. The hydrophilic layers 44 and 52 may cause the water within the channels 20 and 28 to form a film instead of water droplets so that the water does not significantly block the channels 20 and 28. The hydrophilic layers 44 and 52 may decrease the contact angle of the water that may accumulate within the channels 20 and 28 so that the reactant gas is able to flow through the channels 20 and 28 at low loads.

In one experiment, a carbon cloth with a thickness of 8 mils was placed on top of a stainless steel plate and water was allowed to drop on one end of the plate and the flow of the water was observed. The water flowed inside the channels in a way that is identical to when the channels of the plate are coated with hydrophilic silica-based coatings, for example colloidal silica particles like Nano-x or vapor deposited silica. However, the invention is not limited to embodiments that achieve such performance.

Figure 2:
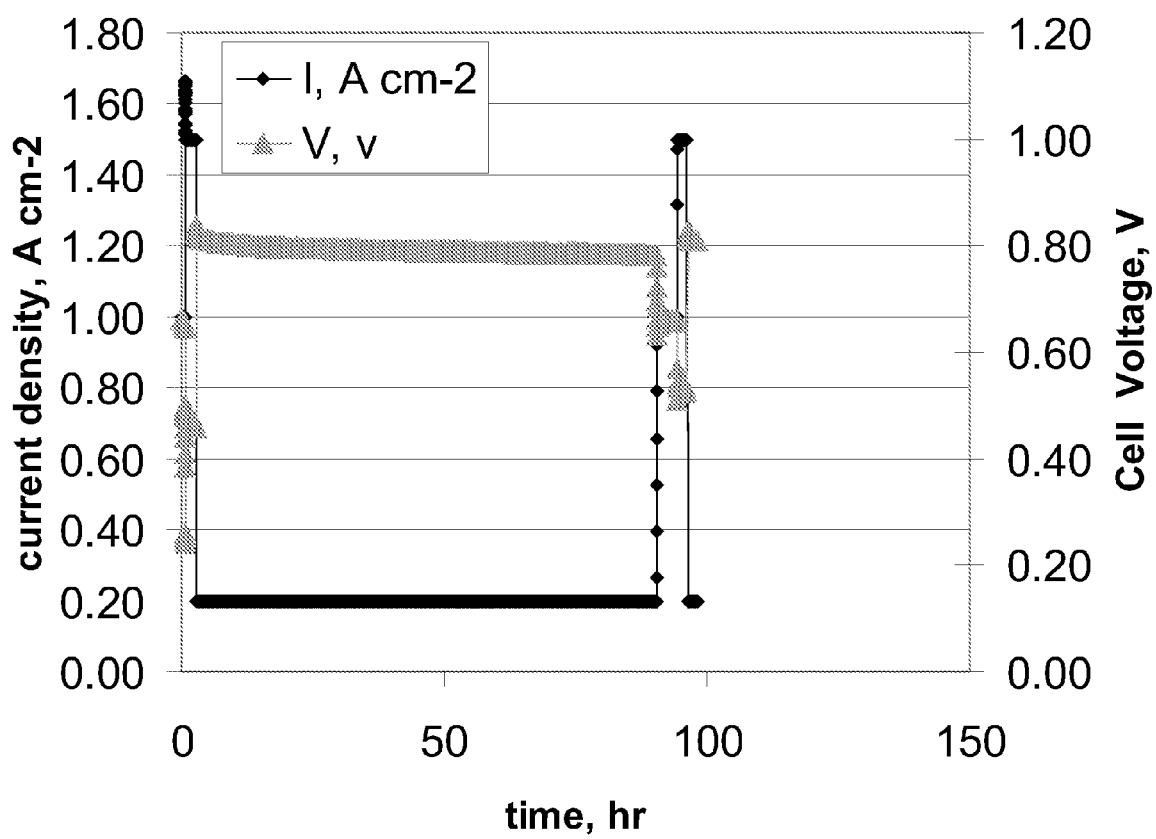
FIG. 2 is a graph of current density and cell voltage versus time.

In another experiment, a single fuel cell test was conducted using Poco graphite plates and a Gore 5720 membrane electrode assembly whereby the carbon cloth with a thickness of 8 mils was inserted between the gas diffusion media and the Poco graphite plate on the anode side of the cell. The test was conducted at 100% relative humidity and 7 PSIG back pressure on both the cathode and anode sides. The current density was changed and the cell voltage was recorded to monitor any performance degradation with time. FIG. 2 shows the current density and cell voltage versus time. The cell ran for over three days with no change in performance or flooding observed during the test indicating that the hydrophilic mat did not interfere with the behavior of the gas diffusion media on the anode side. The experiment also shows that the hydrophilic mat or layer would improve water management inside the fuel cell environment without the need of a hydrophilic coating on the bipolar plates.

In various embodiments, the polymer electrolyte membrane 32 may comprise a variety of different types of membranes. The polymer electrolyte membrane 32 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the first gas diffusion media layer 40 or the second gas diffusion media layer 48 may include any electrically conductive porous material. In various embodiments, the gas diffusion media layer may include non-woven carbon fiber paper or woven carbon cloth which may be treated with a hydrophobic material, such as, but not limited to, polymers of polyvinylidene fluoride (PVDF), fluroethylene propylene, or polytetrafluoroethylene (PTFE). The gas diffusion media layer may have an average pore size ranging from 5-40 micrometers. The gas diffusion media layer may have a thickness ranging from about 100 to about 500 micrometers.

In one embodiment, the cathode electrode 38 and the anode electrode 46 may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the first microporous layer 42 or the second microporous layer 50 may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:

1. A product comprising:
    a polymer electrolyte membrane comprising a first face and a second face;
    a cathode electrode over the first face of the polymer electrolyte membrane;
    a first gas diffusion media layer over the cathode electrode;
    a first porous carbon cloth or mat layer that does not include any hydrophobic material therein over the first gas diffusion media layer, and wherein the first porous carbon cloth or mat layer includes polar functional groups or physical features that render the porous carbon cloth or mat layer hydrophilic;
    an anode electrode over the second face of the polymer electrolyte membrane;
    a second gas diffusion media layer over the anode electrode
    a second porous carbon cloth or mat layer that does not include any hydrophobic material therein over the second gas diffusion media layer, and wherein the first porous carbon cloth or mat layer includes polar functional groups or physical features that render the porous carbon cloth or mat layer hydrophilic;
    a first fuel cell bipolar plate comprising a first face and a reactant gas flow field defined in the first face, the reactant gas flow field comprising a plurality of lands and channels, wherein the channels do not include a hydrophilic coating thereon, and wherein the first fuel cell bipolar plate overlies the first porous carbon cloth or mat layer; and
    a second fuel cell bipolar plate comprising a first face and a reactant gas flow field defined in the first face, the reactant gas flow field comprising a plurality of lands and channels, wherein the channels do not include a hydrophilic coating thereon, and wherein the second fuel cell bipolar plate overlies the second porous carbon cloth or mat layer.

2. A product as set forth in claim 1 further comprising a first microporous layer over the cathode electrode.

3. A product as set forth in claim 1 further comprising a second microporous layer over the anode electrode.

4. A product as set forth in claim 1 wherein the first porous carbon cloth or mat layer has a thickness of about 1 to about 8 mils.

5. A product as set forth in claim 1 wherein the second porous carbon cloth or mat layer has a thickness of about 1 to about 8 mils.

6. A product as set forth in claim 1 wherein the first fuel cell bipolar plate and the second fuel cell bipolar plate comprise one of a metal, a metal alloy, or a composite.

7. A product as set forth in claim 1 wherein the first fuel cell bipolar plate and the second fuel cell bipolar plate comprise stainless steel.

8. A product comprising:
a polymer electrolyte membrane;
an electrode over the membrane;
a gas diffusion media layer over the electrode;
a porous carbon cloth or mat layer that does not include any hydrophobic material therein over the gas diffusion media layer, wherein the first porous carbon cloth or mat layer has a thickness ranging between 1 and 8 mils and includes polar functional groups or physical features that render the porous carbon cloth or mat layer hydrophilic; and
a stainless steel fuel cell bipolar plate comprising a reactant gas flow field defined by a plurality of lands and channels over and in contact with the porous carbon cloth or mat layer.

9. A product as set forth in claim 8 wherein the lands of the stainless steel fuel cell bipolar plate contact the porous carbon cloth or mat layer and the channels of the stainless steel fuel cell bipolar plate do not include a hydrophilic coating thereon for contact with water contained in a reactant gas flowing through the reactant gas flow field.

10. A product as set forth in claim 8 further comprising a microporous layer over the electrode.

11. A process comprising:
providing a polymer electrolyte membrane comprising a first face and a second face;
providing a cathode electrode over the first face of the polymer electrolyte membrane;
providing a first gas diffusion media layer over the cathode electrode;
providing a first porous carbon cloth or mat layer that does not include any hydrophobic material therein over the first gas diffusion media layer;
providing an anode electrode over the second face of the polymer electrolyte membrane;
providing a second gas diffusion media layer over the anode electrode; and
providing a second porous carbon cloth or mat layer that does not include any hydrophobic material therein over the second gas diffusion media layer;
treating at least one of the first or second porous carbon cloth or mat layers to render the least one of the first or second porous carbon cloth or mat layers hydrophilic;
providing a first fuel cell bipolar plate over the first porous carbon cloth or mat layer, wherein the first fuel cell bipolar plate comprises a first face and a reactant gas flow field defined in the first face, the reactant gas flow field comprising a plurality of lands and channels; and
providing a second fuel cell bipolar plate over the second porous carbon cloth or mat layer, wherein the second fuel cell bipolar plate comprises a first face and a reactant gas flow field defined in the first face, the reactant gas flow field comprising a plurality of lands and channels.

12. A process as set forth in claim 11 further comprising providing a first microporous layer over the cathode electrode.

13. A process as set forth in claim 11 further comprising providing a second microporous layer over the anode electrode.

14. A process as set forth in claim 11 wherein the first porous carbon cloth or mat layer has a thickness of about 1 to about 8 mils.

15. A process as set forth in claim 11 wherein the second porous carbon cloth or mat layer has a thickness of about 1 to about 8 mils.

16. A process as set forth in claim 11 wherein the first fuel cell bipolar plate and the second fuel cell bipolar plate comprise one of a metal, a metal alloy, or a composite.

17. A process as set forth in claim 11 wherein the first fuel cell bipolar plate and the second fuel cell bipolar plate comprise stainless steel.

18. A process as set forth in claim 11 wherein treating the at least one of the first or second porous carbon cloth or mat layers comprises creating polar function groups on the at least one of the first or second porous carbon cloth or mat layers.

19. A process as set forth in claim 18 wherein creating polar functional groups is accomplished using an oxidizing agent.

20. A process as set forth in claim 19 wherein the oxidizing agent comprises at least one of chromic acid, potassium permanganate, or nitric acid.

21. A process as set forth in claim 11 wherein treating the at least one of the first or second porous carbon cloth or mat layers comprises open air plasma assisted physical vapor deposition.

22. A process as set forth in claim 11 wherein treating the at least one of the first or second porous carbon cloth or mat layers comprises ion beam assisted physical vapor deposition.

23. A process as set forth in claim 11 wherein the lands of the first or second fuel cell bipolar plate contact the at least one of the first or second porous carbon cloth or mat layers that has been treated and the channels of the same fuel cell bipolar plate do not include a hydrophilic coating thereon for contact with water contained in a reactant gas flowing through the reactant gas flow field.

* * * * *